United States Patent [19]

Hucker et al.

[11] 4,131,844
[45] Dec. 26, 1978

[54] STATIC VOLTAGE BALANCER

[75] Inventors: David J. Hucker, Rockford, Ill.; Norbert L. Schmitz, Middleton, Wis.

[73] Assignee: Sundstrand Corporation, Rockford, Ill.

[21] Appl. No.: 798,602

[22] Filed: May 19, 1977

[51] Int. Cl.² ............................................. G05F 1/30
[52] U.S. Cl. ...................................... 323/45; 324/107
[58] Field of Search .................... 324/107; 323/24, 45, 323/106; 361/86

[56] References Cited

U.S. PATENT DOCUMENTS

| | | | |
|---|---|---|---|
| 2,577,551 | 12/1951 | White | 323/45 |
| 2,839,719 | 6/1958 | Artzt | 323/45 |
| 3,157,826 | 11/1964 | Norton | 361/86 X |
| 3,160,786 | 12/1964 | Faglie | 361/86 |
| 3,176,214 | 3/1965 | Johnson | 323/45 |
| 3,596,172 | 7/1971 | Harrison | 323/45 |

Primary Examiner—A. D. Pellinen
Attorney, Agent, or Firm—Wegner, Stellman, McCord, Wiles & Wood

[57] ABSTRACT

An in-line voltage balancing circuit sums a trim voltage with each phase voltage of a polyphase generating system to assure that the voltage between each phase and neutral is equal to the average voltage of all the phases. An individual error signal representative of the difference between each phase voltage and the average voltage is provided to individual phase modulator circuits. The phase modulator circuits develop pulse width modulated signals wherein the pulse width is proportional to the amplitude of the error signal. The outputs of the phase modulator circuits are connected to switching amplifiers which provide trim voltages proportional to the phase modulated signals. Summing transformers are employed to sum the individual trim voltage with appropriate phase voltage so that the voltage for each phase equals the average voltage.

15 Claims, 8 Drawing Figures

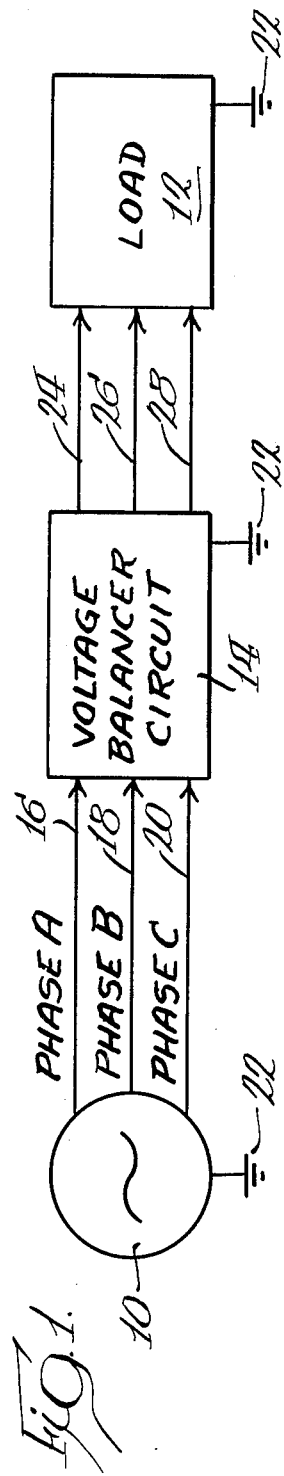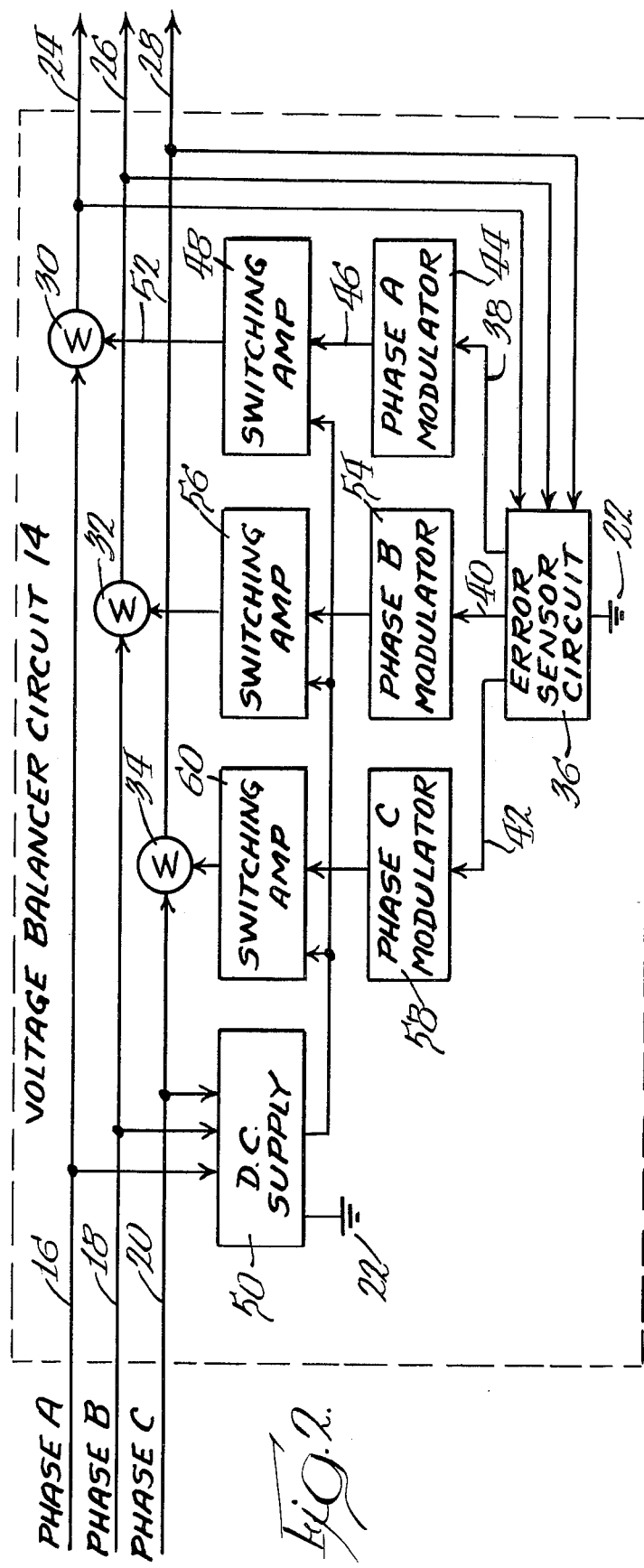

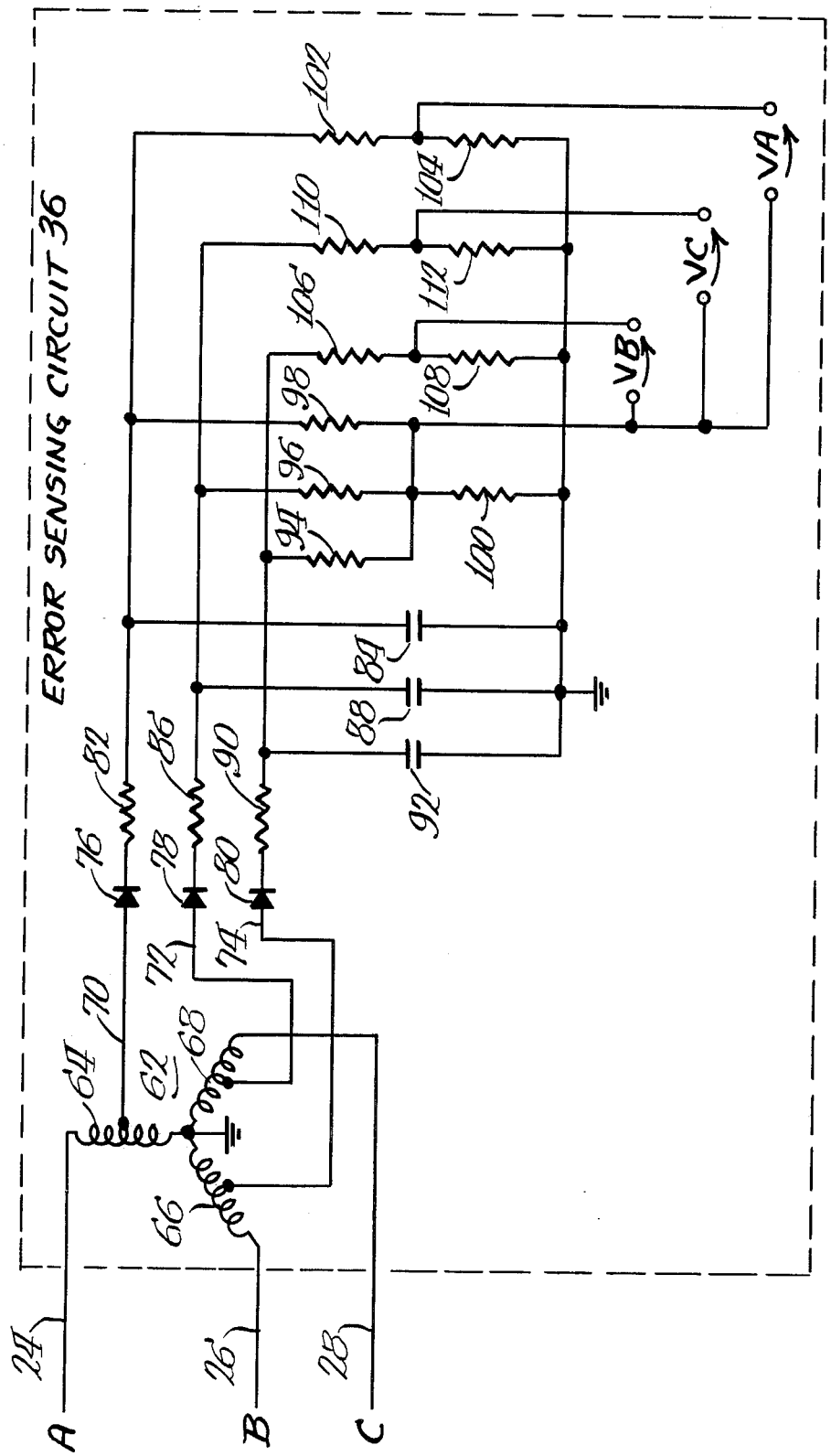

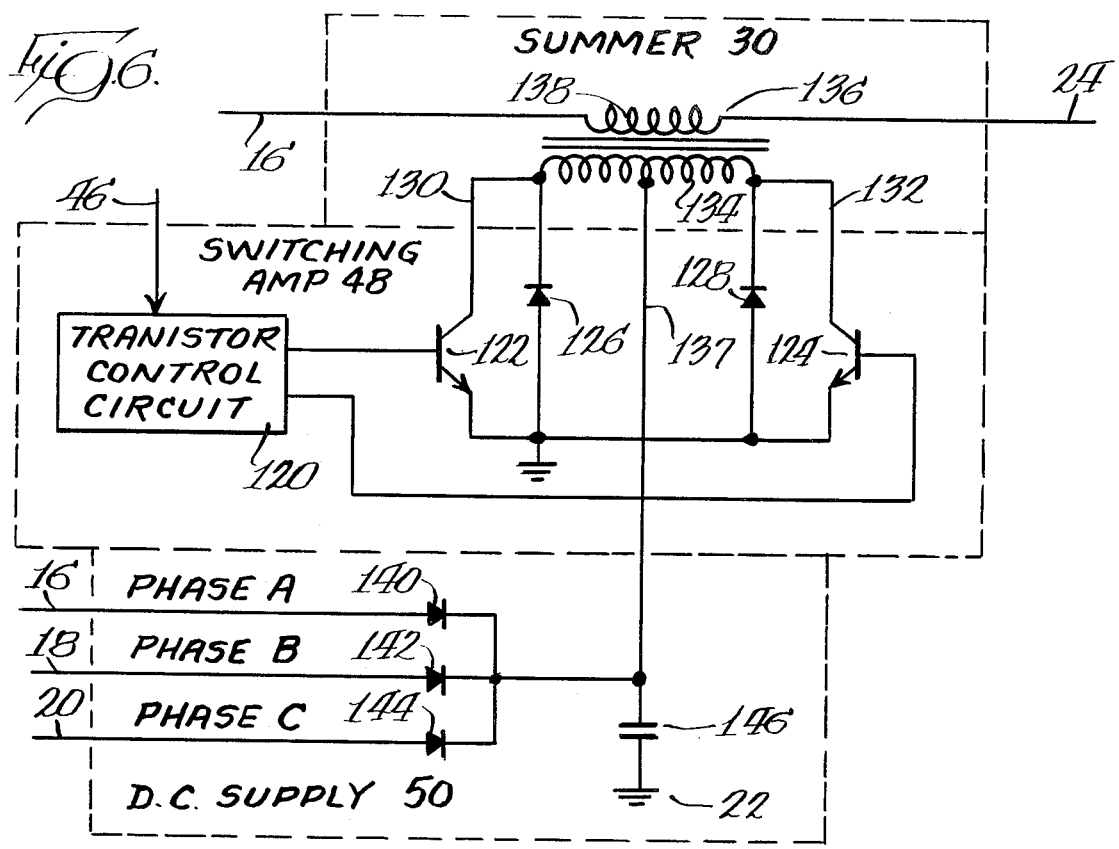
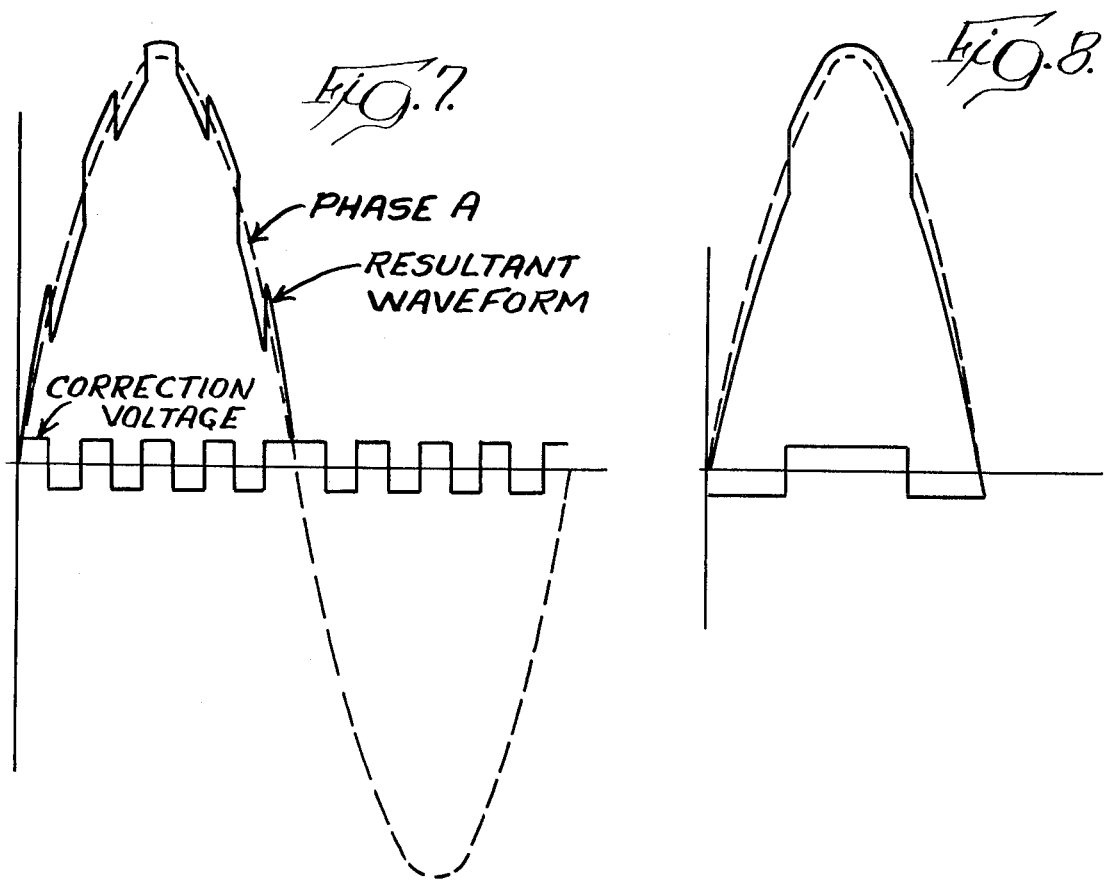

STATIC VOLTAGE BALANCER

BACKGROUND OF THE INVENTION

This invention relates to regulating polyphase supply voltage generating systems and, more particularly, to a static voltage balancing circuit that either adds or subtracts a small trim voltage to or from each phase voltage so that all phase voltages will be equal.

Large equipment, such as aircraft, require that well-regulated polyphase voltages be provided to various loads. When the loads are balanced, the voltages between the phases are equal and this condition is considered normal. However, if the load is unbalanced or unequally distributed between the phases, the voltages from the polyphase generating system will no longer be equal, creating an undesirable condition that requires correction.

We have developed a static voltage balancer that establishes an average voltage of all the voltages from the polyphase generator and controls the voltage of each phase so that each phase voltage equals the average voltage.

SUMMARY OF THE INVENTION

A polyphase voltage generator coupled to a load employs a voltage balancing circuit to assure that the voltage between each phase and a circuit neutral is equal. The phase voltages are summed to provide an average voltage to which each of the phase voltages is compared. Comparison of the average voltage with each phase voltage provides an error signal for each phase. Each error signal is coupled to a phase modulator which provides a series of pulses having a width proportional to the error signal. The pulse width modulated signal, representative of the error for each phase, drives a switching amplifier to provide a trim voltage. A summing transformer sums the trimming voltage to the individual phase voltage to assure that the individual phase voltages equal the average voltage.

It is a feature of the present invention to provide a static voltage balancing circuit which is coupled to each phase and causes each phase voltage to equal the average voltage of all the phases.

Another feature of the present invention is to provide a voltage balancing circuit which has a small effect on the harmonic content of the generating system voltage.

Another feature of the present invention is to provide a voltage balancing circuit that has low power dissipation.

Yet another feature of the present invention is to provide a voltage balancing circuit that does not require an external power supply since a voltage higher than the average voltage is transferred to a phase having a voltage less than the average voltage.

Other features of the invention will become apparent when considering the specification in combination with the drawing in which:

DRAWING

FIG. 1 is a block diagram of a polyphase system coupled to a load and having the voltage balancing circuit in accordance with the present invention;

FIG. 2 is a block diagram of the voltage balancing circuit of FIG. 1;

FIG. 3 is a schematic diagram of the error sensing circuit shown in FIG. 2;

FIG. 6 is a schematic diagram of the DC supply circuit and the summer circuit of FIG. 2;

FIG. 7 shows various waveforms helpful in the understanding of FIG. 6; and

FIG. 8 depicts a waveform provided by another type of modulating system.

DESCRIPTION OF THE PREFERRED EMBODIMENT

Figure 4:
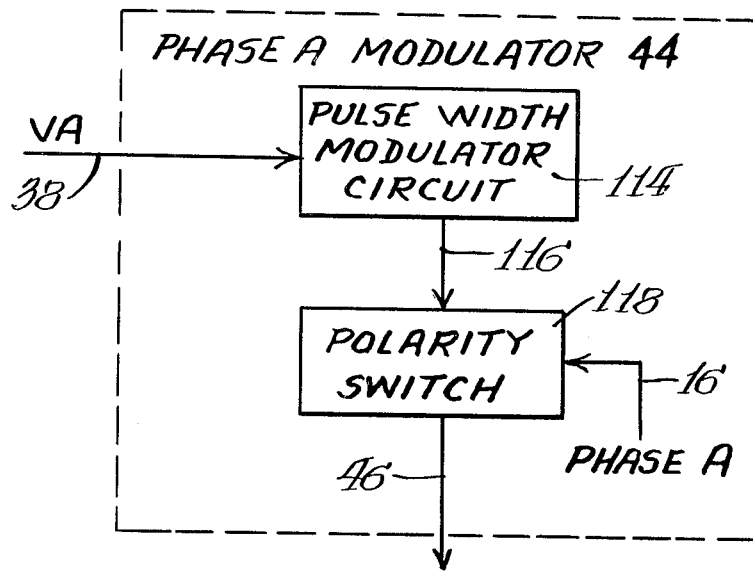
FIG. 4 is a diagram of the phase modulator circuit shown in FIG. 2.

Referring to FIG. 1, three-phase generator 10 is coupled to balanced load 12 through voltage balancer circuit 14. Generator 10 provides a phase A output voltage on line 16, a phase B output voltage on line 18 and a phase C output voltage on line 20. The generator 10 also provides a circuit neutral or ground 22 from which all phase voltages are measured. If the balanced load 12 is unequally distributed between the three phases, a corresponding voltage imbalance will be created between the phases on lines 24, 26 and 28 with respect to ground 22. Voltage balancer circuit 24 removes the voltage imbalances between the phases when and if such imbalances occur. This is accomplished by establishing an appropriate trim voltage and summing it with the appropriate phase voltage to assure that each phase voltage equals the average of the three-phase voltages.

Referring to FIG. 2, phases A, B and C are applied to the voltage balancer circuit 14 by lines 16, 18 and 20. Each of the lines is connected to a summer 30, 32 and 34. The outputs of the summers are connected to load 12 by lines 24, 26 and 28, respectively. Summers 30, 32 and 34 sum a trimming voltage with the phase voltages on lines 16, 18 and 20 to correct for any voltage imbalance between the phases. The corrected voltage is provided on output lines 24, 26 and 28. The error sensing circuit 36 establishes an average voltage equal to the average amplitude of the three phases and compares the amplitude of each phase with the average voltage of all phases. An error signal representative of the difference between the amplitude of each phase voltage and the average voltage is provided for each phase on lines 38, 40 and 42.

The error signal for each phase is applied to a modulator circuit. Phase A modulator circuit 44 provides a pulse width modulated signal on line 46 to switching amplifier 48. The width of the pulses on line 46 is proportional to the amplitude of the error signal on line 38, and the polarity of the pulses on line 46 is responsive to the phase of phase A output voltage as will be explained in greater detail below.

Switching amplifier 48, which is responsive to the pulses from line 46, applies trim voltages to summer 30 by line 52 to correct for an unbalanced condition. The trimming voltage is summed with voltage on line 16. Phase B modulator circuit 54 and switching ampifier 56 and phase C modulator 58 and switching amplifier 60 operate in a manner similar to that just described for phase A.

Referring to FIG. 3, error sensing circuit 36 is shown. Transformer 62 is coupled to the outputs of summers 30, 32 and 34 by lines 24, 26 and 28, respectively. The center of transformer 62 is connected to neutral or ground 22. Transformer 62 has windings 64, 66 and 68. Each of the windings is similar to the other two and all are tapped to provide proportional voltages on lines 70, 72 and 74. Diodes 76, 78 and 80 provide half wave rectification of the signal from the transformer 62. Resistor 82 and capacitor 84 provide filtering for the rectified phase A voltage. Resistor 86 and capacitor 88 provide filtering for the rectified phase C voltage, and resistor 90 and capacitor 92 provide filtering for the rectified phase B voltage. The voltages from the three phases are summed at resistor 100 by currents received from each phase through similar resistors 94, 96 and 98. The voltage across resistor 100 is representative of the average of the voltages from the three phases.

A voltage divider consisting of resistors 102 and 104 provide a voltage proportional to the rectified phase A voltage. A similar voltage divider consisting of resistors 106 and 108 provides a voltage proportional to the rectified phase B voltage, and a voltage divider consisting of resistors 110 and 112 provides a voltage proportional to phase C. Resistors 102, 106 and 110 are equal in value as are resistors 104, 108 and 112.

The output voltage for each phase VA, VB and VC is taken from each voltage divider with respect to the average voltage across resistor 100. Voltages VA, VB and VC represent the error between the individual phase voltages and the average voltage and are applied to the appropriate phase modulator circuit 44, 54 and 58.

Referring to FIG. 4, phase A modulator circuit 44 will be described. This circuit is identical to phase B modulator circuit 54 and phase C modulator circuit 58. Accordingly, the following discussion relating to the phase A modulator circuit applies equally to phase modulators 54 and 58. Pulse width modulator circuit 114 is responsive to the amplitude of VA on line 38. Specifically, pulse width modulator circuit 114 generates a square wave on output 116 at an arbitrarily assigned frequency when the voltage VA on line 38 is zero. A selected frequency should be relatively high compared to the frequency of generator 10 in order to minimize beat frequency effects in the output and to reduce circuit response time. When and if VA becomes positive, representing an error, the square wave becomes unsymmetrical with the negative portion of the wave occupying a greater portion of the time. The more positive VA, the more unsymmetrical the square wave becomes. If the voltage VA on line 38 reverses polarity and becomes negative, the output on line 116 is inverted and the positive portion of the wave becomes longer in duration.

Figure 5:
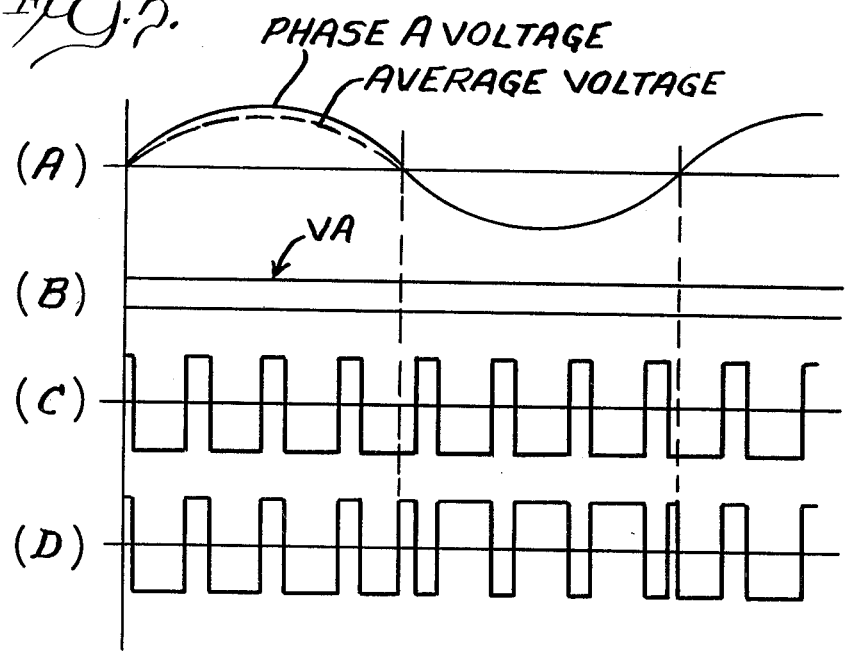
FIG. 5 depicts various waveforms throughout the voltage balancing circuit.

Referring to FIG. 5(A), assume phase A voltage to be slightly greater than the average voltage to produce positive VA (FIG. 5(B)) on line 38. Pulse width modulator circuit 114 provides a plurality of pulses as shown in FIG. 5(C). The higher the amplitude of VA on line 38, the greater the width of the negative portion of the pulses on circuit 116. Polarity switch 118, responsive to the polarity of the phase A output voltage, inverts the waveform on line 116 during the negative half cycles of phase A. As best seen in FIG. 5(D), the waveform is inverted during the negative half cycles of phase A output voltage of FIG. 5(A). The width of the pulses in the pulse width modulated signals depends upon the amplitude of VA and the polarity of the individual pulses depends upon the polarity of the output voltage applied to the load. Polarity switch 118 may be of any polarity-sensitive switch, and forms no part of the invention.

Referring to FIG. 6, the pulse width modulated signal from phase A modulator circuit 44 is coupled to switching amplifier 48 by line 46. The switching amplifier circuit 48 includes transistor control circuit 120, control transistors 122 and 124 and diodes 126 and 128. Transistor control circuit 120 is responsive to the positive-to-negative and negative-to-positive transition of the pulses from phase A modulator circuit 44 (FIG. 5(D)). Transistor control circuit 120 controls the transistors such that either transistor 122 or transistor 124 is on, but not simultaneously. As the pulse width modulated signal on line 46 makes a transition from positive to negative and from negative to positive, transistors 122 and 124 alternately switch on and off. For example, transistor 122 is on when the pulse width modulated signal goes positive, and transistor 124 is on when the pulse width modulated signal goes negative. Transistors 122 and 124 controllably provide a grounding of lead 130 or lead 132 of primary winding 134 of transistor 136. A positive voltage from DC power supply 50 is provided to center tap 137 which defines a first and a second half of primary winding 134. The DC voltage provided to center tap 137 is present at all times. Diodes 126 and 128 provide a path for current flow when phase A power must be absorbed and returned to power supply 50. As best seen in FIG. 7, a current is directed from the center tap 137 to either lead 130 or lead 132, depending upon the ON/OFF condition of transistors 122 and 124. The voltage developed in the first or second half of primary winding 134 induces a trim voltage in secondary winding 138. Thus, the trim voltage is summed with phase A output voltage at secondary winding 138 to create the resultant waveform.

Power supply 50 provides the required DC voltage by half wave rectification of the three phases by diodes 140, 142 and 144. The DC voltage is integrated by capacitor 146 to provide short term energy storage while maintaining the DC voltage constant over a period of time.

When phase A error voltage VA is zero and modulator 44 provides a square wave output, transistors 122 and 124 and diodes 126 and 128 transfer power back and forth between summer 30 and power supply 50. When the individual phase voltages equal the average voltage of all the phase voltages, the total power transferred between summers 30, 32 and 34 and power supply 50 is zero.

Other types of modulator systems may be employed to provide slightly different trim voltages in summer 30. For example, referring to FIG. 8, a modulator which provides a pulse width modulated signal wherein one pulse is generated for each half period of the phase voltage is shown. The width of the pulse is proportional to the amount of correction required, and establishes a trim voltage which is summed with the phase voltage once each half period.

We claim:
1. A voltage balancing circuit for a polyphase generating system having n voltage outputs comprising:
  means coupled to the n voltage outputs for establishing an average voltage representative of the average amplitude of the voltages from the n outputs;
  means for establishing n error signals, one for each of the n voltage outputs, said n error signals representative of any difference between the average voltage and each of the voltages from the n outputs;
  means responsive to the n error signals for providing n trim voltages, one for each of the n voltage outputs; and means for summing the n trim voltages with the n voltage outputs so that the amplitude of each of the n voltage outputs equals the average value of the amplitude of the voltage from the n outputs.

2. The voltage balancing circuit of claim 1 wherein the means for providing n trim voltages include:

means for generating n pulse modulated waveforms, one for each of the n error signals, the width of the pulses in each of the pulse width modulated waveforms being proportional to the amplitude of each of the n error signals; and means responsive to the n pulse modulated waveforms for generating the n trim voltages.

3. The voltage balancing circuit of claim 2 wherein the means for generating n pulse width modulated waveforms includes:

pulse width modulator means, responsive to the n error signals, for establishing n series of pulses, one series for each of the n error signals, the pulses in each series becoming wider as the amplitude of the error signal increases; and means responsive to the polarity of the n voltage outputs for reversing the polarity of the pulses in each series of pulses when the polarity of the n voltage outputs reverses to provide the n individual pulse width modulated waveforms.

4. A voltage balancing circuit for a polyphase generating system having n voltage outputs and a neutral comprising:

means coupled to the n voltage outputs for establishing an average voltage having an amplitude equal to the average amplitude of the voltages from the n outputs;

means for establishing n error signals, one for each of the n voltage outputs, said n error signals representative of any difference between the average voltage and each of the voltages from the n outputs;

means for generating n individual pulse width modulated waveforms, the width of the pulses in the individual pulse width modulated waveforms being proportional to the amplitude of the n error signals;

means responsive to the n individual pulse width modulated waveforms for providing n individual trim voltages representative of the difference between the average voltage and each of the voltages from the n voltage outputs; and means for summing the n individual trim voltages with the n voltage outputs so that each of the n individual voltage outputs equals the average voltage.

5. The voltage balancing circuit of claim 4 wherein the polyphase generating system is a three-phase generating system and n equals 3.

6. The voltage balancing circuit of claim 4 wherein the means for generating n individual pulse width modulated waveforms include:

n pulse width modulators, one for each of the n error signals, each pulse modulator providing a series of pulses when the error signal is zero and wider pulses when the error signal increases; and means responsive to the polarity of the n voltage outputs for determining the polarity of each n series to provide the individual pulse width modulated waveforms.

7. The voltage balancing circuit of claim 4 wherein the means for generating n individual pulse width modulated waveforms each include:

a modulator for providing a series of pulses, the width of the pulses in the series being proportional to the amplitude of the error signals; and means responsive to the polarity of the n output voltages for establishing the polarity of the series of pulses to provide the n individual pulse width modulated waveforms.

8. The voltage balancing circuit of claim 4 for a three phase system wherein said means for establishing the average voltage include:

means for providing voltages proportional to the three phases phases A, B and C;

means for rectifying the voltages proportional to phases A, B and C to provide rectified voltages proportional to phases A, B and C; and means for combining the rectified voltages from phases A, B and C to provide the average voltage.

9. The voltage balancing circuit of claim 8 wherein the means for providing voltages proportional to phases A, B and C include:

transformer means coupled between neutral and phases A, B and C, the transformer means tapped to provide the voltages proportional to phases A, B and C.

10. The voltage balancing circuit of claim 8 wherein the means for rectifying the voltages proportional to phases A, B and C include:

diodes coupled to the means for providing voltages proportional to phases A, B and C for providing half-wave rectification of each phase.

11. The voltage balancing circuit of claim 8 wherein the means for combining the rectified voltages from phases A, B and C to provide the average voltage include:

a resistor connected between each of phases A, B and C, each resistor connected to a fourth resistor connected to neutral, the average voltage being taken across the fourth resistor.

12. The voltage balancing circuit of claim 11 wherein the means for generating the error signals include:

a first and a second resistor forming a voltage divider for each of the error signals, each voltage divider coupled between the means for rectifying the voltages and the neutral, the error signals being taken between the first and the second resistors of the voltage dividers and the fourth resistor.

13. The voltage balancing circuit of claim 8 further including:

filter means coupled to the means for rectifying the voltages for filtering the rectified voltages proportional to phases A, B and C.

14. The voltage balancing circuit of claim 4 wherein the means for summing each of the n trim voltages with the n voltage outputs therefor include:

a DC supply;

a transformer having a primary winding with a center tap defining a first and a second half, the secondary winding connected in series with the generating system and a load and the center tap connected to the DC supply;

means connected to the first and second half and responsive to the n pulse width modulated waveforms for selectively causing current to flow in either the first or the second half to induce the trim voltage into the secondary winding.

15. A voltage balancing circuit for a three-phase generating system, said generating system providing phase A, B and C output voltages to a load, said voltage balancing circuit comprising:

means coupled to the three-phase generating system for establishing an average voltage, said average voltage having an amplitude equal to the average value of the phase A, B and C output voltages;

means for providing a first error signal equal to any difference between the amplitude of the phase A voltage and the average voltage;

means for generating a first pulse width modulated signal in response to the first error signal wherein the pulse width of the first pulse width modulated signal is proportional to the amplitude of the first error signal;

means responsive to the first pulse width modulated signal for developing a first correction voltage proportional to the first pulse width modulated signal;

means for summing the phase A output voltage with the first correction voltage;

means for providing a second error signal equal to any difference between the amplitude of the phase B voltage and the average voltage;

means for generating a second pulse width modulated signal in response to the second error signal wherein the pulse width of the second pulse width modulated signal is proportional to the amplitude of the second error signal;

means responsive to the second pulse width modulated signal for developing a second correction voltage proportional to the second pulse width modulated signal;

means for summing the phase B output voltage with the second correction voltage;

means for providing a third error signal equal to any difference between the amplitude of the phase C voltage and the average voltage;

means for generating a third pulse width modulated signal in response to the third error signal wherein the pulse width of the third pulse width modulated signal is proportional to the amplitude of the third error signal;

means responsive to the third pulse width modulated signal for developing a third correction voltage proportional to the third pulse width modulated signal; and means for summing the phase C output voltage with the third correction voltage.

* * * * *